United States Patent [19]

Cropley

[11] Patent Number: 5,197,582

[45] Date of Patent: Mar. 30, 1993

[54] ELECTRIC DOOR OPENER FOR SLIDING DOORS

[75] Inventor: L. Eric Cropley, King City, Canada

[73] Assignee: Northern Eureka Refrigeration Co. Limited, Downview, Canada

[21] Appl. No.: 679,545

[22] Filed: Apr. 2, 1991

[30] Foreign Application Priority Data

Apr. 3, 1990 [CA] Canada .................................. 2013683

[51] Int. Cl.⁵ ........................ B60K 41/20; E05F 15/10
[52] U.S. Cl. ..................................... 192/1.37; 74/425; 74/606 R; 49/28
[58] Field of Search ................. 192/1.37, 143; 74/425, 74/89.21, 606 R; 49/26, 28; 310/62, 74

[56] References Cited

U.S. PATENT DOCUMENTS

| | | | |
|---|---|---|---|
| 2,854,113 | 9/1958 | Hallden | 192/143 X |
| 3,012,447 | 12/1961 | Wallace | 192/139 X |
| 3,333,477 | 8/1967 | Denkowski | 192/139 X |
| 3,367,687 | 2/1968 | Jenkins | 403/261 |
| 4,079,597 | 3/1978 | Lindner et al. | 192/1.37 X |
| 4,750,294 | 6/1988 | Lafontaine | 49/28 |
| 4,858,481 | 8/1989 | Abraham | 192/143 X |
| 4,908,538 | 3/1990 | Geberth, Jr. | 310/62 X |
| 4,979,603 | 12/1990 | Wheatland | 49/28 X |

FOREIGN PATENT DOCUMENTS 1136488 11/1982 Canada.
1147599 6/1983 Canada.
1165785 4/1984 Canada.

OTHER PUBLICATIONS

Nordic Doors-Technical Data Sheet TDS/451.
Marathon-The Long Distance Industrial Door, 1990.
Hercules-Cold Storage Doors.
Custom Electric Door Operators-Doorlec Corporation.
Architect Data Sheet ADS-21-Jamison Jamiglide.
"Butcher Boy"-Refrigerator Doors and Hardware.
Clark Door Owners' Manual 21000 Operator-Data Book 854.
Cold Facts About Cold Storage Doors-Clark Door.
The Clark Way to Energy Savings Through Cold Storage Doors-Clark Door.
Clark Door Technical Data Sheet-DS-502-issue date: Sep. 1983.
The Clark Way to Industrial Doors-Clark Door.
Y. Paquette Equipments-Refrigerated Warehouse Doors and Over-Head Doors (Residential and Commercial).

Primary Examiner—Rodney H. Bonck
Assistant Examiner—Andrea Pitts
Attorney, Agent, or Firm—R. Lewis Gable

[57] ABSTRACT

An electric operator for a sliding door mounted for sliding movement along a track, comprising a motor having an iron cooling flywheel disposed on a drive shaft thereof, the flywheel being provided for imparting a predetermined amount of inertia for starting and stopping of the motor such that the operation of the motor is characterized by a soft start and stop. A worm gear reducer is connected to the drive shaft for effecting a predetermined reduction ratio of rotation. A limit switch is coupled to the reducer for limiting rotation of the drive shaft to a predetermined number of rotations, and apparatus is provided for coupling rotation of the drive shaft to the linear movement of the sliding door along the track.

7 Claims, 5 Drawing Sheets

ELECTRIC DOOR OPENER FOR SLIDING DOORS

This invention relates in general to electric sliding door operators, and more particularly to a sliding door operator for moving heavy insulated door panels without undue stress or jerkiness.

Industrial door operators are well known and have been used in various applications.

For example, cold storage compartments in the food industry require that the operator must be capable of functioning under extreme temperature and frequency of usage conditions.

It has been found that existing industrial electric door operators used for heavy sliding doors are characterized by generally high inertia start and stop, which causes undue stress on the operator and related door components, often resulting in premature failure of roller chains, brake assemblies, limit travel devices and related door and track hardware.

Previous attempts to eliminate high inertia starting and stopping on high speed electric door operators through electronic solid state DC operator drives have proven unreliable, due to their highly complex design resulting in component failures. Moreover, such prior art operators have been found to be difficult to service by maintenance personnel.

According to the present invention, an electric door operator is provided which implements a soft start and stop feature for relieving stress on the operator and related door components. The novel operator is of straightforward design, and can be easily serviced by trained personnel.

In accordance with an aspect of the present invention, there is provided an electric operator for a sliding door mounted for sliding movement along a track, comprising:

a) a motor having an iron cooling flywheel disposed on a drive shaft thereof, said flywheel imparting a predetermined amount of inertia for starting and stopping of said motor such that operation of said motor is characterized by a soft start and stop;

b) a worm gear reducer connected to said drive shaft for effecting a predetermined reduction ratio of rotation of said drive shaft;

c) a limit switch coupled to said reducer for limiting rotation of said drive shaft to a predetermined number of rotations; and d) means for coupling rotation of said drive shaft to linear movement of said sliding door along said track.

A preferred embodiment of the invention will be described in greater detail below with reference to the following drawings, in which.

Figure 1:
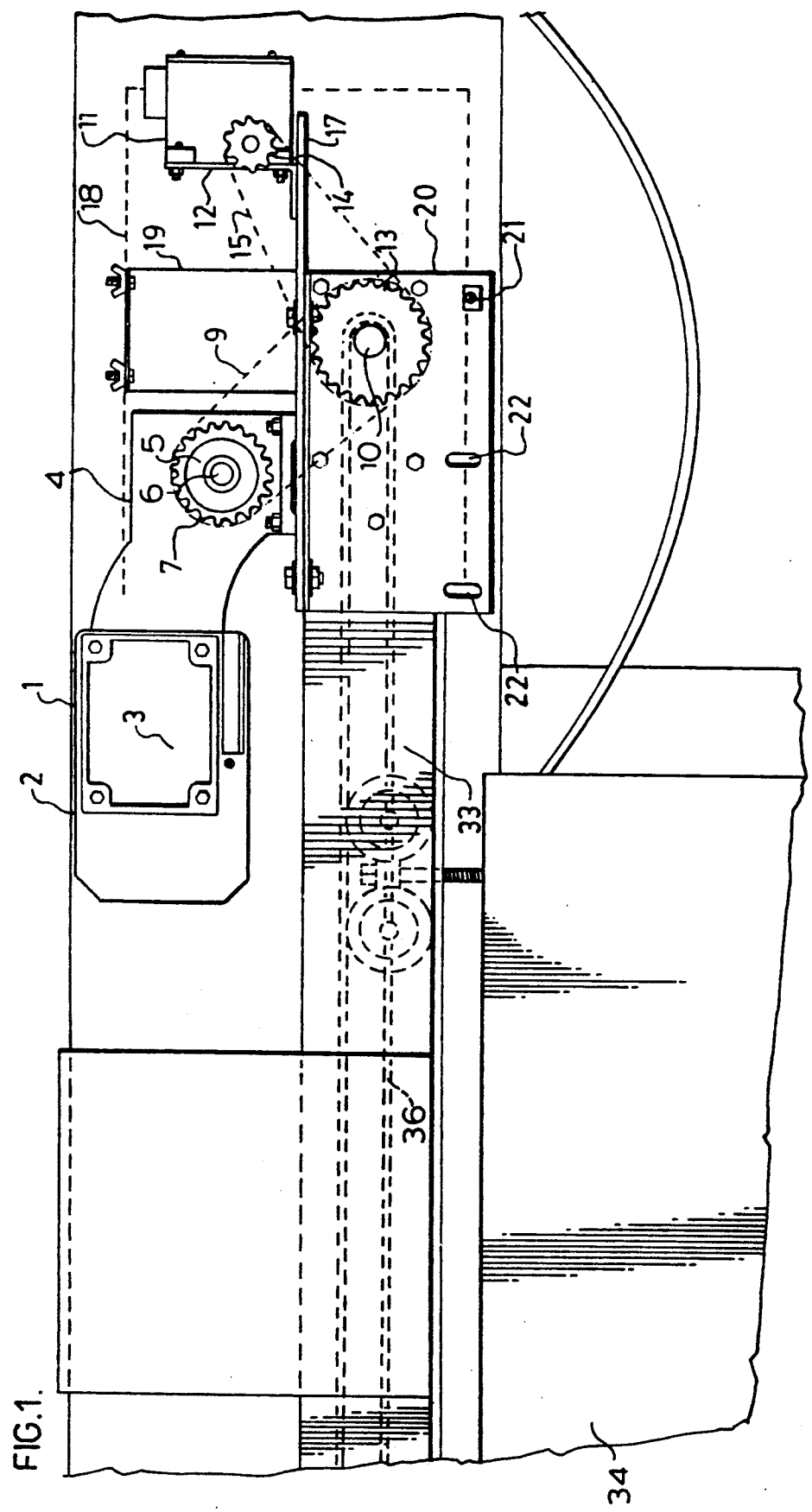
FIG. 1 is an elevation view of an electric door operator in accordance with the preferred embodiment.

Turning to FIG. 1, the operator assembly is shown comprising a motor 1 which, in accordance with the successful prototype, incorporates an internal cast iron cooling flywheel mounted to the drive shaft thereof, as discussed in greater detail below with reference to FIG. 5. According to the successful prototype, the motor 1 is a one-half horse power TEFC three phase AC worm gear brake motor manufactured by SEW Eurodrive. The motor is 3600 RPM and rated for 2500 operations per hour at no load with a full load RPM of 3300. The motor is thermally protected using three phase readily available current and incorporates a prewired integral brake.

A motor terminal box 3 is mounted to motor 1 for providing electrical connection between the coils and brake of the motor 1 and control circuitry discussed in greater detail below with reference to FIG. 4.

The motor 1 is connected to an integral worm gear reducer 4 which, according to the preferred embodiment, performs a 20.5:1 reduction from the rotations of the internal drive shaft of motor 1. The motor 1 is provided with an integral disc brake and is assembled in one piece. All components are stock, but are assembled to the specific requirements of the present invention.

Figure 4:
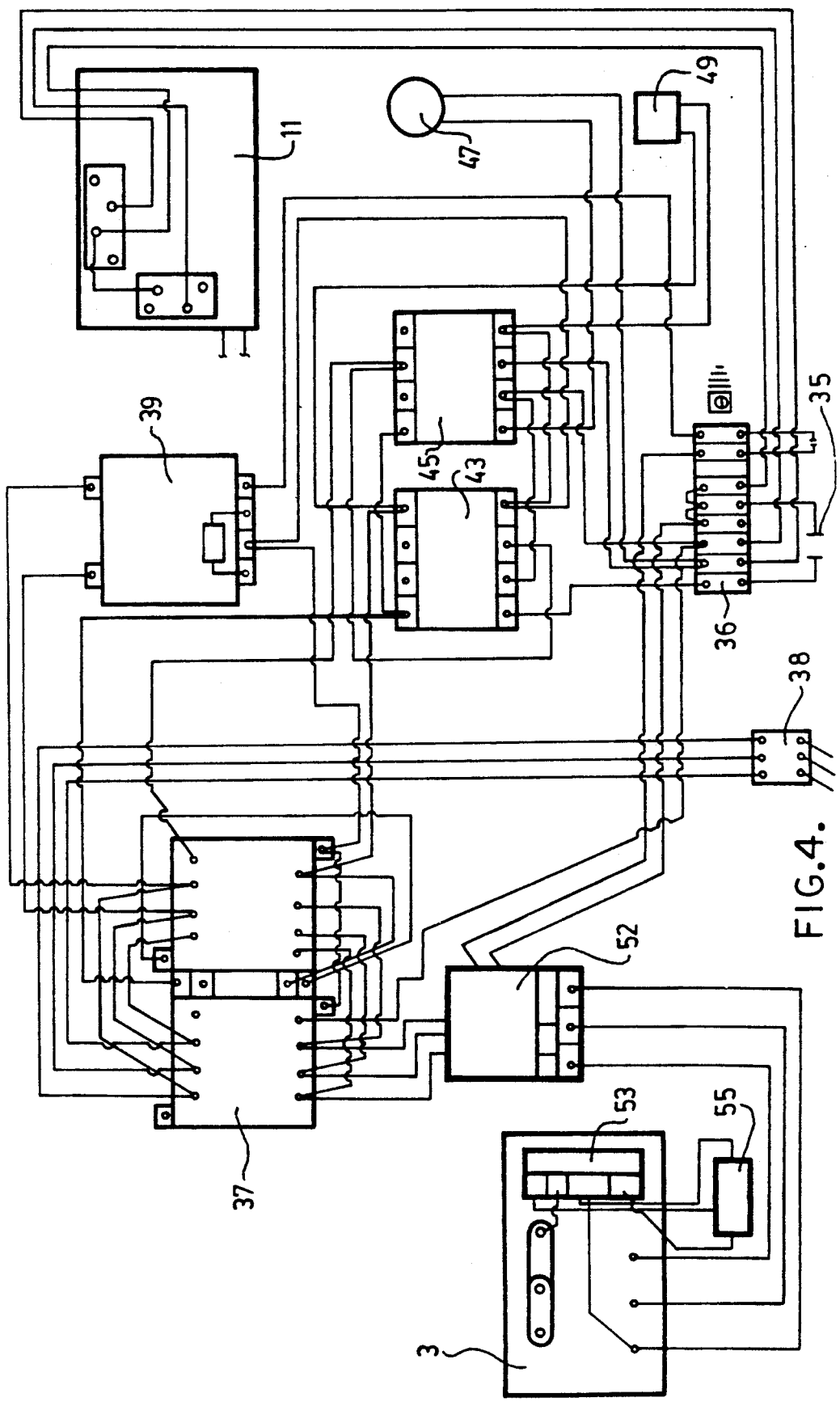
FIG. 4 is a schematic diagram of control circuitry of the operator in accordance with the preferred embodiment.

The internal disc brake is preferably rated for torque of the 44 inch pounds, complete with a style BG half wave rectifier prewired in the motor control box (FIG. 4).

Thus, rotation of the internal drive shaft of motor 1 and subsequent reduction via reducer 4 results in rotation of an output drive shaft 6 of the reducer 4. The drive shaft 6 is coupled to a drive sprocket 7 via a torque limiter 5 in a well known manner. The torque limiter 5 prevents movement of a sliding door 34 to which the operator assembly is connected in the event of mechanical resistance to movement of the door, (e.g. an object being located in the path of the door).

In operation, the torque limiter 5 is designed to slip in the event of a predetermined torque being exceeded. The torque limiter 5 is fully adjustable to compensate for a variety of door weights which the operator must carry.

The motor 1 is provided with a thermal overload to protect the motor should an electric or mechanical overload occur. Due to the low ampage draw of the motor 1, the thermal overload provides enhanced protection in safely shutting down the operator even if the mechanical overload provided by torque limiter 5 is over tightened such that slippage cannot occur.

The drive sprocket 7 is coupled to a transfer sprocket 8 by means of a drive chain 9. According to the preferred embodiment, the drive sprocket 7 and 8 consisted of 20 and 26 teeth, respectively, and drive chain 9 consisted of a #40×50 link chain.

Figure 3:
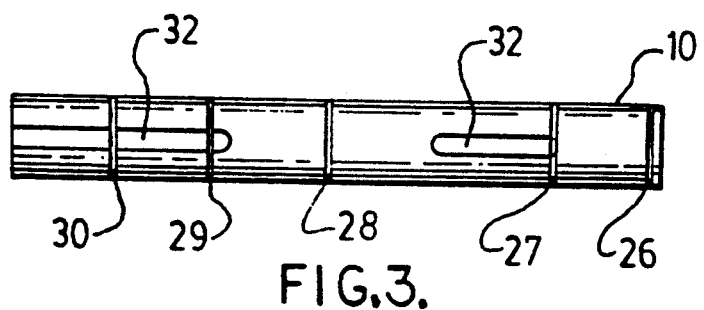
FIG. 3 illustrates the construction of a driven shaft in accordance with the operator of the present invention.

The transfer sprocket 8 drives a driven shaft 10 which, according to the preferred embodiment, is 1" by 7¼" shown in greater detail with reference to FIG. 3. The driven shaft 10 is preferably of 1" precision ground chrome steel. The shaft is located 45° below and from horizontal of the reducer sprocket 7 and limit switch sprocket 14.

A limit switch 11 is provided to position or set the open and closed locations of the door in a well known manner. According to the preferred embodiment, limit switch 11 comprises a plurality of internal cams mounted side by side for independent set-up of the open and close limits, and is set for operation on a reduction of 2.4:1 and a further reduction of 18:1, 36:1, 72:1 or 108:1, depending on the width of the door.

Limit switch accuracy of ±¼" has been attained with a successful prototype of this invention through testing of various ratios in the primary limit reduction. The limit switch accuracy remains constant regardless of ratio. The ease of adjustment of the limit switch, however, is directly proportional to the number of turns of the limit switch shaft 16 and the inner gear ratio of the limit switch of 18:1, 36:1, 72:1 and 108:1, as discussed. Each ratio of the limit switch has a finite number of usable turns of 16, 32, 64 and 96, respectively.

The limit switch 11 is mounted via a bracket 12 to aluminum top mounting plate 17. A 24 tooth limit switch drive sprocket is mounted to the driven shaft 10 for coupling rotation of the shaft 10 to rotation of a 10 tooth limit switch sprocket 14 via a preferably number 41×46 link limit switch chain 15. Rotation of the driven sprocket 14 results in rotation of the limit switch shaft 16.

Since the limit switch primary reduction is coupled to driven shaft 16, its speed of rotation is predetermined by the drive reduction which is set to allow for sufficient revolutions per minute (r.p.m.) necessary to attain desired door movement speed. For ease of limit adjustment, it is desirable to utilize as many of the above usable turns as possible dependant on door width, and hence the number of rotations of the limit switch driven sprocket 14 required to move the door a predetermined distance for clearing door openings.

Testing was performed over a travel distance of 65" with a 36:1 limit ratio of 32 usable turns of the limit switch shaft 16. On a primary reduction of 2:1, 17 turns of the 36 available were attained which proved difficult to set predetermined limit travel. On a primary reduction of 3:1, 26 turns of the shaft 16 were attained. Setting of predetermined travel improved proportionally. The speed of the large driven shaft 10, however, caused the small driven shaft 16 to revolve at an r.p.m. too high for consistent limit stopping. Various ratios between 2:1 and 3:1 were then tested, including the variation of sprocket sizes, the number of teeth and the chain size and length.

The above tests proved that a ratio 2.4:1 of number 41 chain of 46 links or approximately 23" and a number 41×24 tooth drive sprocket 13 coupled to a number 41×10 tooth driven sprocket 14 on the limit switch shaft 16 provided the most consistent limit setting in combination with ease of limit setting adjustment. This limit setting adjustment is further enhanced by the choice of limit switch ratio of 18:1, 36:1, 72:1 or 108:1, dependent on door travel such that as many of the usable turns of 16, 32, 64 or 96 are utilized over the travel of the door.

Figure 2:
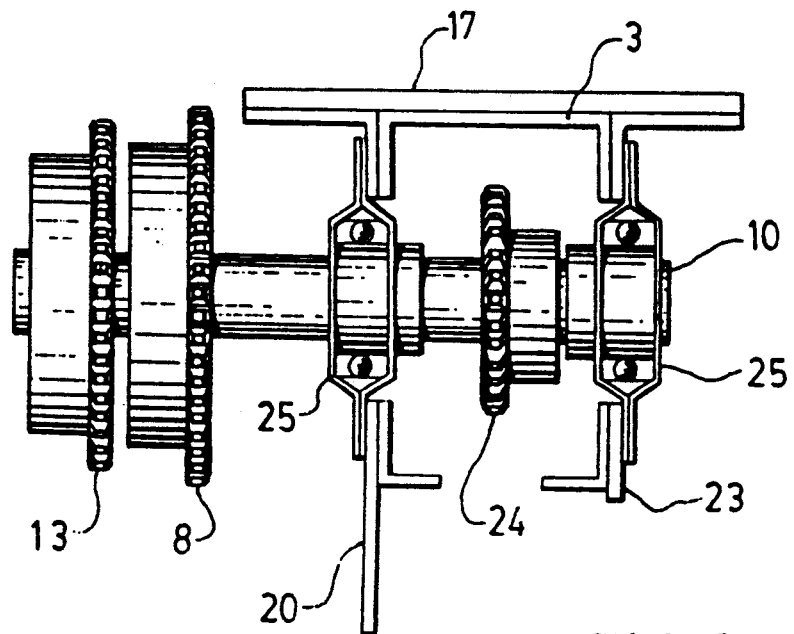
FIG. 2 is a schematic end view of the drive assembly of the operator in accordance with the preferred embodiment.

As shown in FIGS. 1 and 2, a drive track 33 is provided for mounting one or more doors 34 in a well known manner.

Turning to FIG. 2, the driven shaft 10 is shown mounted in two 1" bore flanged radial bearings 25, perpendicular to the motor 1 but horizontal to the reducer output shaft 6. The flanged radial bearings 25 are installed with 5/16 carriage bolts and nuts.

A preferably 15 tooth driven sprocket 24 is mounted to the drive shaft 10 for driving an internal chain 36 within the drive track 33 (FIG. 1). Also mounted to the drive shaft 10 are the aforementioned preferably 26 tooth transfer sprocket 8 and 24 tooth limit switch drive sprocket 13.

The motor 1, reducer 4, drive track 33 and limit switch 11 are mounted to a top plate 17 (FIGS. 1 and 2), which is preferably of ¼" thick aluminum by 6" wide by 16" long. Also connected to the plate 17 is a chain guard 18 mounted via a chain guard mounting bracket 19. The mounting plate 17 is mounted via a front side mounting plate 20 (FIGS. 1 and 2) a lower guard mounting bracket 21 (FIG. 1) and incorporates slots 22 for free standing support legs (not shown) for supporting the weight of the operator should it be mounted to a non-structural wall.

At the rear, the mounting plate 17 is connected via a rear side mounting plate 23 (FIG. 2). Each of the side plates 20 and 23 are identically stamped in order that they may be turned for right hand or left hand use after stamping. Each of the plates 20, 23 contain mounting slots and holes (e.g. slots 22 and additional holes) for attaching the radial bearings 25 (FIG. 2) to the mounting plate 17. Although the side mounting plates 20, 23 are designated for right hand or left hand assembly, the back mounted one of the plates (e.g. plate 23 shown in FIG. 2) must be sheared prior to assembly such that the bottom of the plate is approximately 1¾" shorter than the front plate 20.

The mounting side plate 20 also contains a stamped hole to affix the bottom portion of the chain guard in combination with guard mounting bracket 21.

Turning briefly to FIG. 3, the driven shaft 10 is shown having a retaining ring rear bearing 26 and retaining ring driven sprocket 27 adapted for connection to the radial bearing 25, and a retaining ring front bearing 28, retaining ring 26 tooth transfer sprocket 29 and retaining ring 24-tooth limit switch drive sprocket 30 for coupling to the radial bearing 25, transfer sprocket 8 and limit switch drive sprocket 13, respectively.

The driven shaft 10 also incorporates a pair of ¼" by ⅛" key ways 32 for the respective sprockets.

Turning to FIG. 4, a schematic diagram of control circuitry of the operator of the preferred embodiment is illustrated including a remote control switch 35 (i.e. pullcord switch) which has normally open, momentary contacts connected to a terminal block 36 and reversing contactor 37 (i.e. motor starter) with built-in electrical and mechanical interlocks such that only one coil can be energized at a time. Three-phase operating power is supplied to the motor 1 via terminal block 38 connected to contactor 37.

A control transformer 39 is provided to convert dangerous high line voltage down to a safe 24 volts AC for all non-motor-related controls. The transformer incorporates an integral 2 amp control fuse 41 to protect the circuitry in the event of a power surge or transformer breakdown.

Control relays 43 and 45 are provided in the form of general purpose 8 pin plugs for ease of replacement. Should a relay fail, it is only necessary to remove it from its socket and plug in a new one. It is not necessary to touch any of the control wiring.

An air pressure switch 47 is provided with a diaphragm and normally open contacts to reverse the one or more door panels on the safety edge, in a well known fashion. A counter 49 is also provided which is preferably a non-ressetable 6 digit unit for counting only once on closing such that a complete open/close cycle counts as one. The counter is used to provide maintenance personnel with actual usage data for maintenance schedules, which data is valuable when servicing an operator designed for heavy usage.

A thermal overload 51 for the motor is attached directly to the reversing contactor 37 and has an adjustable amperage setting to allow for the proper setting dependent on line voltage. The thermal overload contains integral heater elements which expand on an excessive amperage draw as would be experienced if the motor 1 is overloaded so as to cause the thermal overload to trip, thereby immediately shutting off power to the motor.

A brake rectifier 53 is included in the form of a half wave rectifier located in the motor terminal box 3 and is preferably prewired by the manufacturers so as not to require any assembly or field wiring. The rectifier is connected, in turn, to the internal brake 55 within motor 1.

Figure 5:
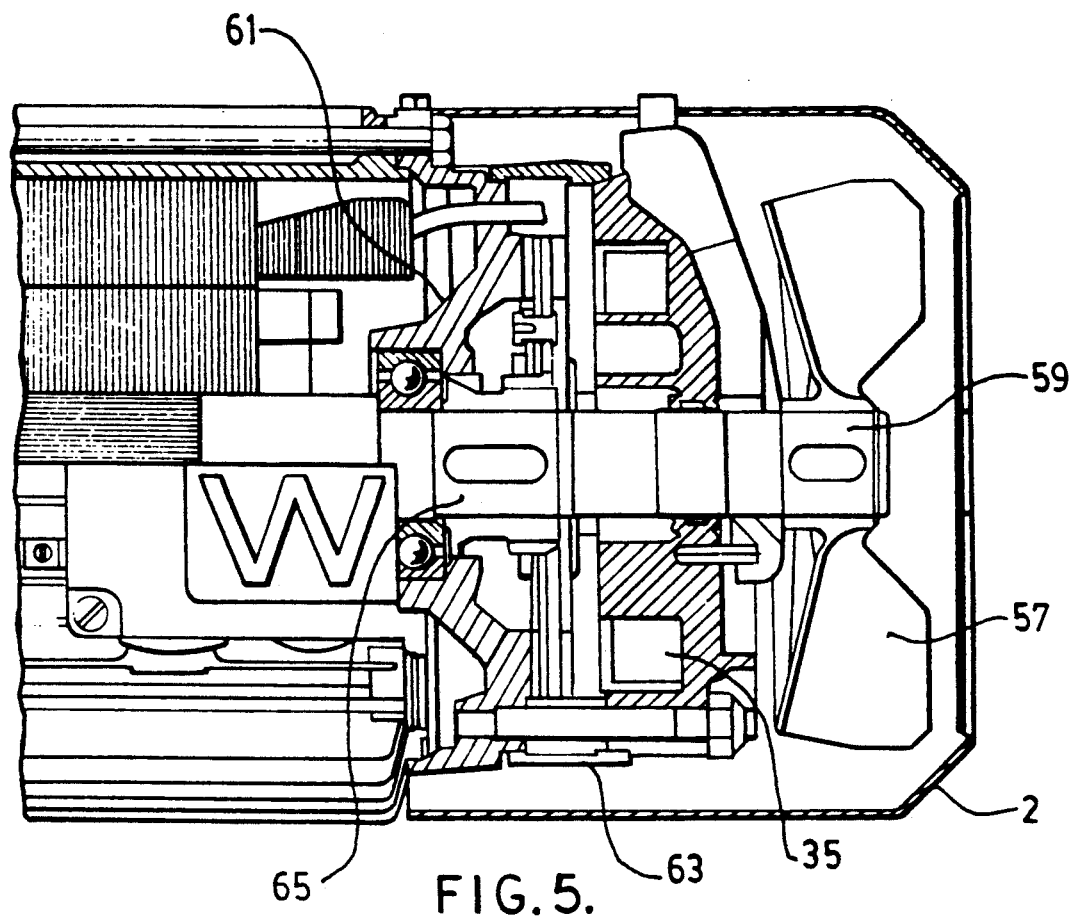
FIG. 5 is a cross-sectional view of the motor for the door operator in accordance with the preferred embodiment.

With reference to FIG. 5, a cross-sectional view of the motor 1 is shown comprising motor end shield 2 enclosing the cast iron fly wheel 57 which is mounted to motor shaft 59. The internal brake assembly 61 is shown constructed in accordance with well known prior art design. The brake assembly 61 is mounted within the end shield 2 and is protected by a tight fitting elastic rubber seal 63.

The drive shaft of motor 1 is connected internally to gear motor 4 in a well known manner.

Figure 6:
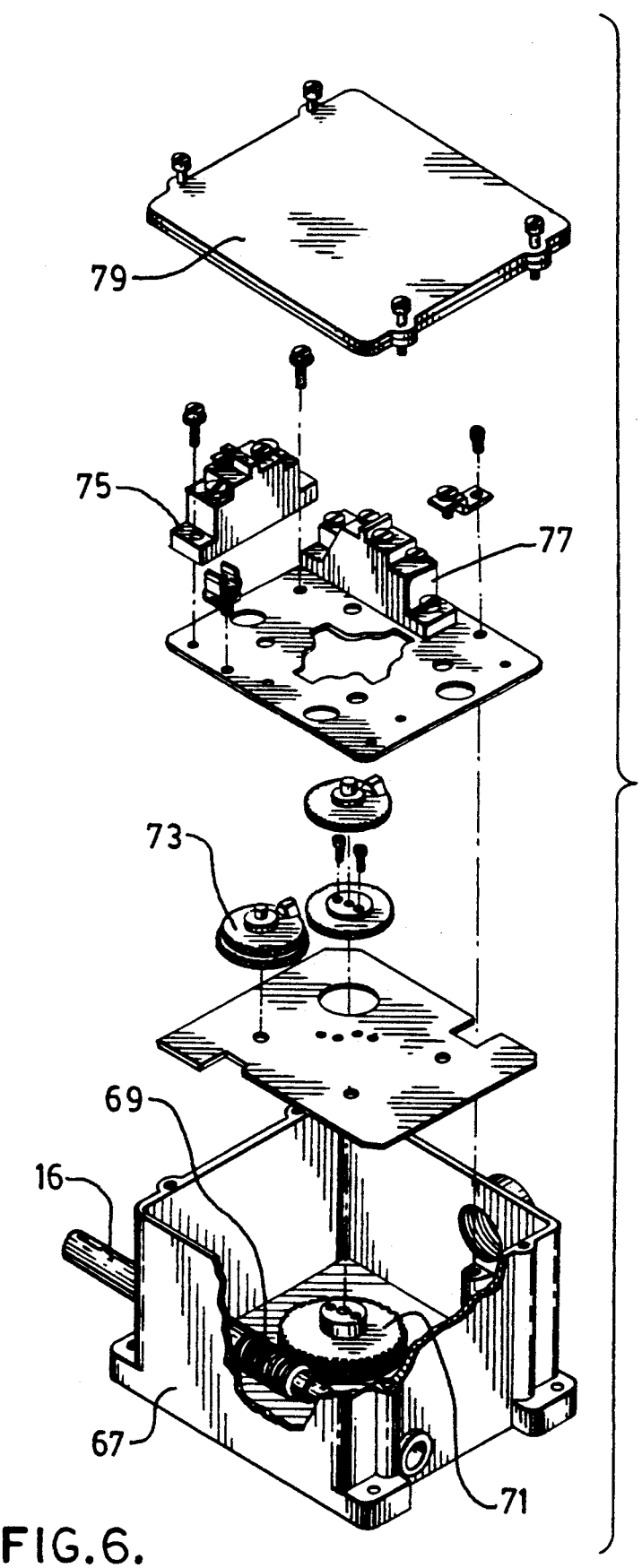
FIG. 6 is an exploded view of a limit switch of the door operator in accordance with the preferred embodiment.

An exploded perspective view of the limit switch 11 is shown in detail with reference to FIG. 6. The limit switch 11 comprises a housing 67 enclosing a steel worm 69 connected to limit switch shaft 16 and a worm gear assembly 71. A cam gear assembly 73 is mounted to the worm gear assembly 71 for activating respective ones of open and close microswitches 75 and 77, which, in turn, are connected to the relay 43 (FIG. 4) for operating motor 1. The internal components of the limit switch 11 are shielded by means of a top plate 79 affixed to the housing 67.

Figure 7:
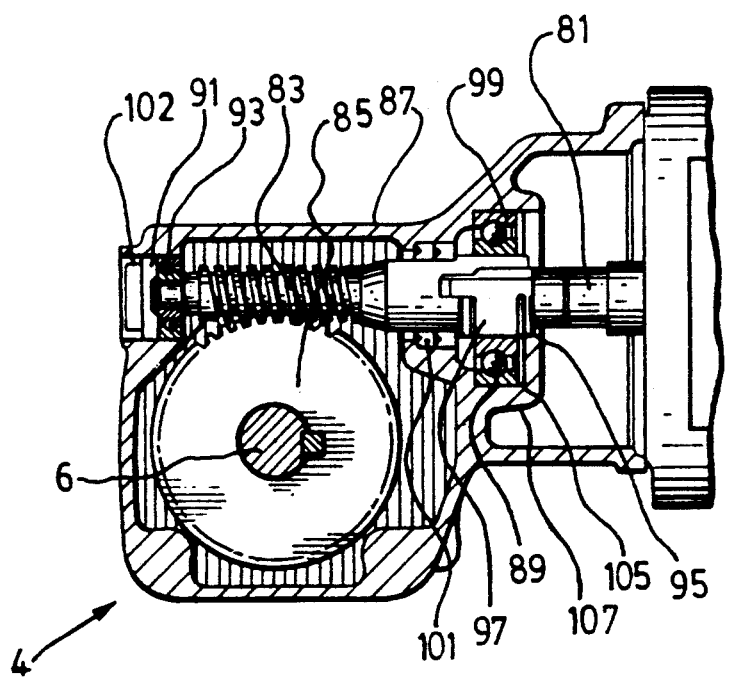
FIG. 7 is a cross-sectional view of a worm gear reducer of the electric door operator in accordance with the preferred embodiment.

Turning to FIG. 7, a cross sectional view of the worm gear reducer 4 is shown for translating rotary motion of the motor input shaft 81 into reduced rotary motion of the output drive shaft 6. Specifically, the worm gear reducer comprises a worm 83, worm wheel 85, gear case 87, ball bearing 89, snap ring 91, further ball bearing 93, thrust washer 95, further snap ring 97, shim 99, oil seat 101, bearing cap 102, additional snap ring 105 and additional shim 107, all connected in a well known manner.

As discussed above, an important aspect of the present invention is the provision of a soft start and stop feature for greatly reducing the stress on the operator while allowing for greater speed. The soft start and stop feature prevents overloading of the operator components while stopping a heavy load (e.g. industrial door) suddenly without having to reduce to a slower speed. This aspect is accomplished economically and effectively by the combination of the cast iron cooling fly wheel 57 within motor 1, the use of a preferably 3600 r.p.m. motor, and the use of half wave brake rectifier 53 within the integral brake system 61 of the motor.

More particularly, the preferably 3600 r.p.m. motor can be operated at 575 volts and a 3-phase full load current of 0.66 amps versus the prior art 1800 r.p.m. motor most commonly used for door operators, which has a full load current of 0.86 amps. The result is that the 3600 r.p.m. motor takes slightly longer to reach full r.p.m. than the 1800 r.p.m. motor, creating the first phase of the soft start function.

The half wave rectifier 31 (FIG. 4) has a relatively slow response time (e.g. 30 milliseconds) for activating the brake coil 35, hence contributing to the first phase of the soft stop.

Lastly, the internal cast iron cooling fly wheel 57 on the drive shaft 65 of motor 1 acts as a cooling fan, but also creates a drag on the motor as it starts and stops. Thus, the combination of the 3600 r.p.m. motor 1, inherent reduced torque of the fly wheel, and slow response time of the brake rectifier, results in a true soft start and stop operation.

Consequently, the reliability of the operator is greatly enhanced due to the soft start and stop feature, since stress on all components is reduced under high usage and abuse. Shock and backlash on the reducer 4 are greatly reduced under high frequency stops and starts due to the reduced inertia resulting in a reduced line of stress through the entire operator. Hence there are fewer broken or prematurely worn components than with prior art systems.

An additional advantage of the operator according to the present invention is that it is easily adjustable and serviceable. One of the problems with prior art operators is that many parts and adjustable devices are not readily accessible or are located in awkward positions. According to the present invention, all moving parts and adjustable devices are located at the front of the operator and are readily accessible and visible at eye level with the guard 18 removed. In addition, adjustment of the limit switch can be made at eye level with the guard 18 in place.

With respect to its low maintenance requirements, the motor 1 is totally enclosed for protection from the elements, the reducer 4 is sealed and lubricated for life with synthetic oil rated for service from −25° C. to +80° C., with double input and output lip seals, and is made as an integral part of the motor. No oil changes are required for the reducer 4, hence there are no drain or fill plugs and no requirement for a breather. The brake assembly 61 is an integral part of the motor 1 located at the back of the motor inside the end bell and is protected by tight fitting elastic rubber seal 63. It is easily accessible for brake disc regapping or replacement. All bearings in the motor 1, reducer 4 and driven shaft 6 are grease packed and sealed, the torque limiter 5 is constructed with ball bearings and has moisture resistant friction plates. The driven shaft 6 is chrome plated, and all sprockets are heavy B style plated.

In operation, with reference to FIGS. 1–6, a remotely located momentary contact switch 35 is normally open, but may be contacted in order to trigger relay 43 which, in response, signals the open side of the motor starter 37.

Next, the brake coil 35 releases, and the motor 1 starts rotations from 0 up to 3300 r.p.m., starting slowly until inertia overcomes the flywheel drag. The motor input shaft 81 is reduced through the 20.5:1 worm gear 4 to 161 r.p.m. on the reducer output shaft 6, in a well known manner.

Torque limiter 5 and the 20 tooth drive sprocket 7 on the output shaft rotate counter-clockwise. In response, the drive chain 9 drives the 26 tooth transfer sprocket 8 counter-clockwise on the driven shaft 10.

The driven shaft 10 turns counter-clockwise, and in addition drives shaft 16 of the limit switch 11 counter-clockwise and the drive sprocket 24 counter-clockwise for causing the door panel to travel to the open position along drive track 33.

As the driven shaft 10 rotates the opening door, the driven limit switch sprocket 14 rotates the limit switch internal worm gear causing the lower left hand cam 73 to rotate clockwise until a predetermined setting is reached and the cam strikes the microswitch 75 in the limit assembly causing the power to be shut off to the open contactor coil 37. This causes the coil to release, thereby shutting off power to the motor 1.

As a result, motor 1 shuts off, brake rectifier 31 shuts off cutting power to the brake coil, and the internal brake is applied via springs.

The cast iron flywheel continues to turn until the rotational inertia thereof is spent, causing the door to coast to a stop (i.e. soft stop).

A re-activation of the remote control switch 35 causes the one or more door panels to move to the closed position except that the circuitry of FIG. 4 directs the signal through the close side of the contactor 37. Should an obstruction on closing of the doors strike the safety edge of the doors, the air switch 47 closes thereby activating the relay 45 which removes power from the contactor close coil 37 and also signals the relay 43 to activate the open side of contactor 37 for causing the door to reverse direction instantly and move to it full open pre-determined limit setting.

On door operators of prior art design this instant reverse has been found to cause great stress on the door operator, chains and related door components due to the high inertia of the operator combined with the weight and linear inertia of the door panels. This stress is greatly reduced in the operation of the present invention since the soft start and stop features result in smoothly stopping and starting the door panels in the reverse direction with minimal stress on the operator, chain and related door components.

If, upon closing or opening the door, the door encounters an overload, the torque limiter 5 slips as the output shaft 6 continues to turn with the motor running. However, all other parts of the operator remain stationary until power turns off or the thermal overload 41 trips. However, if, on closing or opening of the door, the operator strikes an overload but the torque limiter 5 is too tight to slip, the thermal overload 41 trips.

The principles of soft start and stop apply to all manners of starts and stops due to overloads, instant reverses and oscillating situations. Accordingly, mechanical stresses on the door operator components are reduced for all operating conditions.

The operator of the present invention is particularly useful for sliding doors which are designed for use in food processing, pharmaceutical plants and related industries where the doors must be kept close at all times but are used frequently. For example, 62,000 cycles (e.g. 124,000 operations) would constitute normal yearly usage of the operator, and in accordance with the present invention would require minimal maintenance and adjustment.

In the food processing and pharmaceutical and related industries, the door is required to open and close swiftly, reliably and accurately. Many of the locations in which it is used are controlled environments in which the door must remain closed but for product access, in which case the door must open and close smoothly and without delay. The door must also close consistently in the same location $\pm\frac{1}{4}''$ or loss of conditioned air may result.

According to the successful prototype, the above objects have been attained with a speed of 15" per second for a single slide version or 30" per second for a double slide version. The increase of speed with the present invention is coupled with lower stress on components than is provided with prior art door operators.

Other embodiments or variations of the present invention are possible within the sphere and scope of the as defined in the claims appended hereto.

I claim:

1. An electric operator for a sliding door mounted for sliding movement along a track with respect to a horizontal reference surface, comprising:
   a) a motor having an iron cooling flywheel disposed on a drive shaft thereof, said motor during energization imparting a rotational acceleration to said drive shaft and during stopping imparting a rotational deceleration to said drive shaft, said flywheel imparting a predetermined amount of inertia to oppose said rotational acceleration and said rotational deceleration;
   b) a worm gear reducer connected to said drive shaft for effecting a predetermined reduction ratio of rotation of said drive shaft;
   c) a limit switch coupled to said reducer for limiting rotation of said drive shaft to a predetermined number of rotations; and
   d) means for coupling rotation of said drive shaft to linear movement of said sliding door along said track, said means for coupling further comprises a drive chain connected to said motor and a limit chain connected to said limit switch, each said drive chain and limit chain being disposed at approximately 45° to said horizontal reference surface and connected via a sprocket.

2. An electric operator as defined in claim 1, wherein said drive chain comprises 50 links and is angled at said 45° to horizontal for effecting an appropriate teeth link ratio.

3. An electric operator as defined in claim 1, wherein said transfer sprocket comprises 26 teeth.

4. An electric operator as defined in claim 1, further including a drive sprocket for coupling said drive shaft and drive chain, said drive sprocket comprising 20 teeth.

5. An electric operator as defined in claim 1, wherein said additional driven sprocket comprises 15 teeth.

6. An electric operator as defined in claim 1, wherein said limit chain effects a 2.4:1 ratio of rotation using 46 links with an additional drive sprocket connected to said limit switch.

7. An electric operator as defined in claim 1, wherein said limit chain has a length of 23 inches.

* * * * *